Jan. 12, 1965  F. L. SIMPSON  3,164,941
FLEXIBLE COTTON PICKER SPINDLE
Filed Aug. 3, 1962
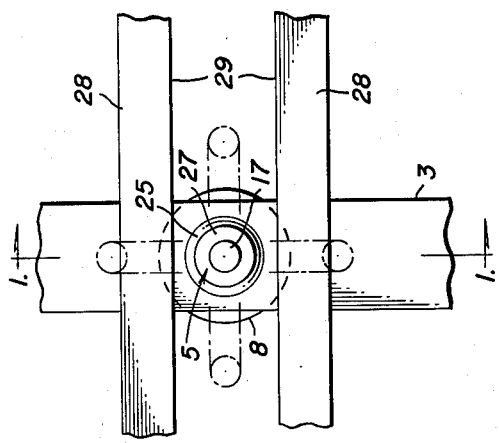
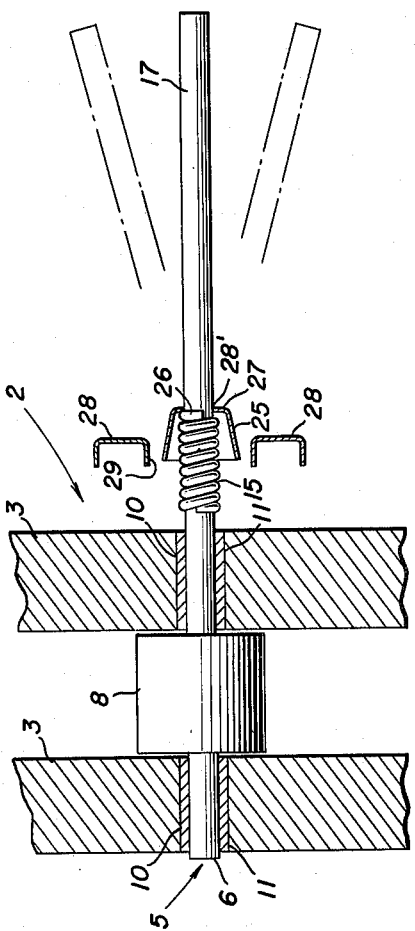
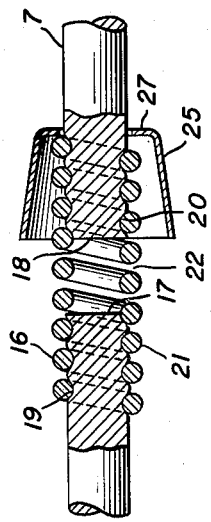
INVENTOR.
FORREST L. SIMPSON
BY
ATTY.

United States Patent Office 3,164,941
Patented Jan. 12, 1965

3,164,941
FLEXIBLE COTTON PICKER SPINDLE
Forrest L. Simpson, Memphis, Tenn., assignor to International Harvester Company, Chicago, Ill., a corporation of New Jersey
Filed Aug. 3, 1962, Ser. No. 214,659
1 Claim. (Cl. 56—50)

This invention relates to cotton harvesters and more specifically to a novel picker spindle therefor.

Certain types of cotton pickers such as particularly shown in U.S. Patent No. 2,510,258 employ numerous spindles to insure extensive coverage of a plant as well as the long dwell period within the plant. Such spindles inherently possess one fault and that is that they frequently become bent and thus in rotating through the plant tear up the plant and also cause malfunctioning in the machine. Various devices have been suggested or incorporated in such machines such as spindle straighteners and alarms to signal the operator of the machine. These devices in general have been either too costly or impractical and furthermore necessitated a replacement of the defective spindle after the damage is done. If such occurrences are frequent, then obviously the harvesting is delayed and the "down time" of the machine becomes excessive.

It is a general object of the invention to provide a novel spindle of the type which will readily fit into existing machines and at the same time obviate the recited and other disadvantages of the previous spindles.

A further object of the invention is to provide a novel cotton picker spindle which incorporates between the picking and the support end a flexible connection which accommodates canting or angling movements of the spindle to clear obstructions and the like.

A further object of the invention is to provide a novel cotton picker spindle wherein the picking end and the supporting end of the spindle are axially aligned and spaced apart and are interconnected by a coil spring which threads with its convolutions onto threads provided on the adjacent ends of the picker and the support end portions of the spindle.

A further object of the invention is to provide a novel spindle assembly which comprises a picking portion and a supporting portion interconnected by a helical spring wherein a shield is provided on the picker portion in covering relation to the spring to prevent material from being caught in the spring connection.

These and other objects and advantages inherent in and encompassed by the invention will become more readily apparent from the specification and the drawings, wherein:

FIGURE 1 is a side elevational view partly in section on line 2—2 of FIGURE 1 of the novel spindle shown in association with the mounting structure;

FIGURE 2 is a front end view; and

FIGURE 3 is an enlarged sectional view of a portion of the spindle.

Describing the invention in detail and having particular reference to the drawings there is shown a cotton picker gathering mechanism generally designated 2 which includes a pair of vertical supports 3—3 which are spaced apart laterally, such portion 3—3 being suitably connected to a drive chain or the like and being movable or orbiting about a substantially vertical axis as is well known to those skilled in the art. The support members 3—3 carry a plurality of vertically spaced spindles generally designated 5, each spindle 5 being of cylindrical section and comprising an inner combination drive and support portion 6 and an outer end picker portion 7. The support portion 6 is connected to a drive roller 8 which is disposed between the members 3—3 and opposite ends of the member 6 are journalled in the bearings 10—10 which are mounted in coaxial bores 11 in the members 3—3. Thus the spindle with the roller 8 is freely rotatable. The inner end portion 6 is interconnected with the outer end portion 7 by a resilient means generally designated 15 which comprises a helical tightly-wound coil spring 16 which extends between the adjacent coaxially arranged end portions 17 and 18 of the members 6 and 7. It will be noted that the end portions 17 and 18 are provided with threads 19 and 20 which permit the convolutions or the coils 21 to thread onto the respective ends 17—18 and to retain the parts 6 and 7 together; it being understood that the spindle rotates in the direction of tightening or threading the spring onto the respective portions. It will be seen that there is a space 22 between the inner ends of the portions 17 and 18 and that within this space the portion 7 is adapted to flex as shown in phantom lines in FIGURE 1.

In order to prevent the spring from wrapping with cotton or trash or branches, twigs and the like it is provided a conical shield 25 which is sleeved over the end portion 26 of the spring 15, the shield having a forward end portion with an inturned flange 27 which is apertured immediately as at 28' which snugly admits the finger portion 7 therethrough so that the same are interlocked with each other with a tight substantially pressed fit.

It will be observed that the spindle is so proportioned that the conical shield fits between the slat bars 28—28 which extend horizontally and which provides spaces 29 therebetween or admitting the passage of the shielded portion of the spindle. It will also be appreciated that since the wider portion of the shield is between the adjacent slat bars and the spindle tapers outwardly and maximum movement is permitted of the spindle.

Thus a preferred form of the invention has been described, shown, and it will be readily understood that various other modifications will become readily apparent to those skilled in the art within the scope of the appended claim.

What is claimed is:

A cotton picker spindle comprising a multi-piece element having a picking portion and a supporting portion coaxially arranged and a flexible connection between said portions and further characterized in that said flexible connection comprises a coil spring having convolutions wrapped around adjacent ends of said portions of the spindle and wherein the peripheral portions of said adjacent ends have threads complementary to the coils of the spring and said convolutions of the spring being threaded onto said threads and providing a positive drive for the picking portion of the spindle and said convolutions and threads being formed to effect tightening of the spring with the portions of the spindle pursuant to rotation of the spindle in its operating direction.

References Cited in the file of this patent
UNITED STATES PATENTS 2,605,600 Smith _____ Aug. 5, 1952
2,672,720 Smith _____ Mar. 23, 1954